(12) United States Patent
Schultze et al.

(10) Patent No.: US 9,507,334 B2
(45) Date of Patent: Nov. 29, 2016

(54) PROGRAMMING TEMPLATE FOR DISTRIBUTED APPLICATION PROGRAMS

(71) Applicant: Robert Bosch GmbH, Stuttgart (DE)

(72) Inventors: Stephan Schultze, Lohr-Wombach (DE); Alexander Koehl, Lohr-Pflochsbach (DE)

(73) Assignee: Robert Bosch GmbH, Stuttgart (DE)

( * ) Notice: Subject to any disclaimer, the term of this patent is extended or adjusted under 35 U.S.C. 154(b) by 816 days.

(21) Appl. No.: 13/903,355

(22) Filed: May 28, 2013

(65) Prior Publication Data

US 2013/0325145 A1 Dec. 5, 2013

(30) Foreign Application Priority Data

May 29, 2012 (DE) .................. 10 2012 010 537

(51) Int. Cl.
*G05B 19/42* (2006.01)
*G05B 19/02* (2006.01)
*G05B 19/042* (2006.01)

(52) U.S. Cl.
CPC ............ *G05B 19/02* (2013.01); *G05B 19/0426* (2013.01); *G05B 2219/23261* (2013.01)

(58) Field of Classification Search
CPC ............... G05B 2219/25099; G05B 19/0426; G05B 2219/25101; G05B 19/05; G05B 9/03; G06F 9/44505
See application file for complete search history.

(56) References Cited

U.S. PATENT DOCUMENTS 5,168,441 A * 12/1992 Onarheim .......... G05B 19/0426
700/17
5,392,207 A * 2/1995 Wilson ............... G05B 19/4093
318/568.1

(Continued)

FOREIGN PATENT DOCUMENTS

EP 0718727 B1 * 2/2000 ......... G05B 19/0421

*Primary Examiner* — Darrin Dunn
(74) *Attorney, Agent, or Firm* — Maginot, Moore & Beck LLP

(57) ABSTRACT

The disclosure relates to a programming template for developing an application program that is configured to be executed in a manner distributed over two or more programmable logic controllers. The programming template includes two or more programmable modules configured to be integrated into the application program and executed on a respective associated programmable logic controller. At least one first programmable module has an associated first programmable logic controller, and at least one second programmable module has an associated second programmable logic controller. The programming template comprises a logical communication link between the at least one first and the at least one second programmable module for the purpose of coordination of the at least one first and the at least one second programmable module across control systems.

13 Claims, 3 Drawing Sheets

(56) References Cited

U.S. PATENT DOCUMENTS

| | | | | |
|---|---|---|---|---|
| 5,812,394 A * | 9/1998 | Lewis | G05B 19/0426 | 700/17 |
| 6,076,117 A * | 6/2000 | Billings | H04L 12/44 | 709/249 |
| 6,115,747 A * | 9/2000 | Billings | H04L 12/44 | 709/231 |
| 6,282,699 B1 * | 8/2001 | Zhang | G06F 8/34 | 715/967 |
| 6,445,963 B1 * | 9/2002 | Blevins | G05B 11/32 | 700/19 |
| 6,819,960 B1 * | 11/2004 | McKelvey | G05B 19/054 | 345/418 |
| 7,043,311 B2 * | 5/2006 | Nixon | G05B 19/4188 | 700/28 |
| 7,058,899 B2 * | 6/2006 | Petruk | G06F 8/34 | 715/763 |
| 7,505,817 B2 * | 3/2009 | McDaniel | G05B 19/0426 | 700/17 |
| 8,670,859 B2 * | 3/2014 | Hrachovec | G05B 19/0426 | 318/568.1 |
| 8,959,447 B1 * | 2/2015 | Weldon | G06F 8/34 | 715/769 |
| 2002/0194551 A1 * | 12/2002 | Mueller | F02D 41/2493 | 714/48 |
| 2003/0091059 A1 * | 5/2003 | Pike | H04L 29/06 | 370/462 |
| 2004/0039456 A1 * | 2/2004 | Davlin | G05B 19/0421 | 700/3 |
| 2006/0158309 A1 * | 7/2006 | Lund | G08G 1/0962 | 340/7.48 |
| 2007/0189296 A1 * | 8/2007 | Saito | H04L 47/10 | 370/392 |
| 2007/0198167 A1 * | 8/2007 | Dery | B60R 25/045 | 701/113 |
| 2008/0115146 A1 * | 5/2008 | Claus | H04L 43/08 | 719/313 |
| 2009/0276060 A1 * | 11/2009 | Lu | G05B 19/056 | 700/21 |

* cited by examiner

PROGRAMMING TEMPLATE FOR DISTRIBUTED APPLICATION PROGRAMS

This application claims priority under 35 U.S.C. §119 to patent application no. DE 10 2012 010 537.1, filed on May 29, 2012 in Germany, the disclosure of which is incorporated herein by reference in its entirety.

BACKGROUND

The present disclosure relates to a programming template for developing an application program that is intended to be executed in a manner distributed over two or more programmable logic controllers. It also relates to a computer program for a programming template and to a machine readable storage medium which stores the programming template and/or the computer program.

A programmable logic controller (PLC) is a device which is used to control or regulate a machine or installation and is programmed on a digital basis. In the simplest case, a PLC has inputs, outputs, an operating system (Firmware) and an interface which can be used to load the user program. The user program stipulates how the outputs are intended to be connected on the basis of the inputs. The operating system (Firmware) ensures that the user program always has the current state of the inputs available. Using this information, the user program can connect the outputs such that the machine or the installation works in the desired manner.

The PLC is linked to the machine or installation by means of sensors and actuators. The sensors are connected to the inputs of the PLC and tell the PLC what is happening in the machine or installation. Examples of sensors are light barriers, incremental transmitters, limit switches or else temperature sensors, fill level sensors, etc. The actuators are connected to the outputs of the PLC and provide the opportunity to control the machine or installation. Examples of actuators are contactors for switching on electric motors, electric valves for hydraulics or compressed air, switches, etc.

Conventional application programs can be programmed using the language means of the PLC programming language IEC61131-3. In order to simplify and shorten the development thereof, programming templates are available, such as what is known as the GAT (Generic Application Template) from Bosch Rexroth. In this case, the typical commonalities of the application programs (such as error handling, axle handling, mode-of-operation management or state machines) are tackled universally. The programming template allows a programmer of the application program to concentrate on the special features of his program and means that he now only need fill the programming template with program code at the correspondingly provided locations. He is assisted in this by dialogue-based code generation, for example in order to create and customize new modules or modes of operation. Thus, a well structured and clear application program can be produced in a short time with pretested program code.

Programming templates are generally provided as open example code, in some cases even in combination with a library containing basic elements. Functional expansions on the programming template are made using dialogues, or by means of export/import and "copy & paste".

Programming templates today are usually of modular design. By way of example, typical elements of the programming templates are state machines and machine modules which can be added, removed and/or configured using an assistance interface (e.g. what is known as the GAT Wizard).

Task sections from an overall process are in this case each mapped as functional elements in a software module. The modules are autarkic, encapsulated units without knowledge of one another. For the overall process, the modules need to interact in coordinated fashion, however, which is ensured by a superordinate unit. By way of example, coordination is effected using a state (e.g. AUTO_PRODUCE). This state is ascertained by a superordinate unit on the basis of a preselected machine mode of operation and inputs and is forwarded to the modules. The modules perform the activities that match the state.

On the basis of the prior art today, a programming template is designed for application programs which are executed on a single controller. In this case, all the modules are always present on the controller. However, large machines or installations require the application to be distributed over a plurality of controllers.

An example of such an installation is a printing machine which comprises a plurality of printing towers, with one controller being used per printing tower and each printing tower comprising a plurality of printing mechanisms (modules). When production mode is activated, all of the printing towers and the respective printing mechanisms should adopt the automatic mode in the "Produce" state, for example, and in so doing perform the associated tasks. For this case, an application program needs to be set up to ensure coordination of the modules across control systems.

It is therefore desirable to have a programming template available which allows the modules to be operated in a coordinated manner (across control systems). There are no prepared generic functionalities of a programming template in existence for this case today.

SUMMARY

The disclosure proposes a programming template, a computer program and a machine-readable storage medium having the features described herein.

The inventive programming template is suitable for developing application programs which are each executed in a manner distributed over two or more programmable logic controllers that are connected to one another by a communication network. By way of example, suitable communication networks may be Ethernet, Profinet, Profibus or the like. The inventive programming template comprises two or more programmable modules which can be integrated into the respective application program to be programmed and can be executed on a programmable logic controller that is respectively associated with the modules.

In this case, at least one first instance of the programmable modules has an associated first programmable logic controller and at least one second instance of the programmable modules has an associated second programmable logic controller.

When executed on the respective controller associated with them, the programmable modules can be used for controlling respective associated machine elements, for example.

The inventive programming template comprises a logical communication link between the at least one first and the at least one second programmable module, said logical communication link being used for coordination of the at least one first and the at least one second programmable module across control systems.

The inventive programming template significantly simplifies the development of application programs which are distributed over a plurality of programmable logic controllers and are therefore suitable for large machine installations. Such programs can be used to manage machine controller sections which are present locally using an overall state controller. The disclosure allows simplification or automation of the communication between the overall state controller and local machine controller sections by developed application programs.

The time involvement and the frequency of error when writing distributed application programs of this type can be significantly reduced by predefined functionalities of the modules associated with the different controllers. A user of the programming template can fully program the respective programmable modules in customary fashion and has no additional time involvement as a result of the distribution of the elements.

The necessary functions for networking are preferably included in encapsulated functions in a form that is largely invisible to the programmer. This results in clear application programs.

The programming template according to the disclosure is preferably available as a data structure on a programming device (for example a computer), said data structure particularly allowing a user to fully program the programmable modules. When an application program is written using the programming template, the programmable modules are preferably also instantiated so as then (following compilation thereof) to be transmitted as programmed modules to the respective associated controller and to operate thereon. In this case, the logical communication link is preferably implemented by means of the communication network which connects the programmable logic controllers in such a way that communication by (e.g. programmed) modules operating on different programmable logic controllers is possible.

The application program can be transmitted (and distributed) as a whole or in portions (e.g. modules) to the respective controllers after it/they has/have been written using the programming template. The transmission can in each case be effected using a data link between the programming device and one or more of the programmable logic controllers and/or the communication network between the programmable logic controllers, for example.

Preferably, the programming template comprises a mode-of-operation manager which a user can use to preselect modes of operation and is connected to the logical communication link. Hence, the application program to be programmed can be designed to be variable for different modes of operation (e.g. manual or automatic operation) of the machine or machine elements to be controlled.

In one preferred embodiment, the logical communication link comprises a master module and a slave module. In this case, the master module is set up to operate (following transmission thereof) on the first programmable logic controller, whereas the slave module is set up to operate (following transmission thereof) on the second programmable logic controller. There, the master module and the slave module can communicate preferably via the communication network that connects the programmable logic controllers. The slave module may be present in the programming template as supplementary code which is set up to be loaded onto the second programmable logic controller.

The master and slave modules allow for controllers to perform respective tasks which are used for coordinating the distributed programmable modules and hence the overall control.

The master and slave modules can be used to produce a hierarchy for the coordination of the modules or the programmable logic controllers. In this case, the master module may be superordinate not only to the at least one first programmable module but also to the slave module, which for its part is superordinate to the at least one second programmable module. Thus, the slave module can control the at least one second module by command and/or can detect the status thereof (possibly together with the status of at least one further module which is set up to operate on the second programmable logic controller) and can concentrate on a (possibly joint) actual state.

The slave module may be set up to communicate such an actual state to the master module and/or to forward a target state from the master module to the at least one second programmable module. Thus, the slave module can allow the master module to control the at least one second programmable module.

The master module may be set up to behave in the manner of a concentration of all the other modules from the point of view of a superordinate mode-of-operation manager. Preferably, the master module manages the at least one first programmable module (which is associated with the first programmable logic controller) and also—via the slave module—the at least one second programmable module (which is associated with the second programmable logic controller).

Preferably, the master and slave modules are set up such that initialization of a programmed application program is coordinated by the first programmable logic controller. To this end, the first programmable logic controller (or the master module) advantageously waits until the second programmable logic controller (and possibly further subordinate programmable logic controllers) have registered. Alternatively, a prescribed waiting time may be stipulated. Deactivatability of the waiting process may also be implemented. The master module can then put the first and second programmable logic controllers with the slave module and the first and second programmable modules into the operating state through the initialization states.

This allows fast and secure controlled initialization of the application program.

In one preferred embodiment, the slave module is set up to for its part undertake some or all of the tasks mentioned with the master module vis-à-vis a third programmable logic controller. Similarly, cascades can be set up. By way of example, the first controller can manage programmable modules from the second controller, which for its part manages programmable modules from a third and/or fourth controller, etc.

In this way, it is possible to program complex application software that is coordinated and distributed over a multiplicity of programmable logic controllers.

By contrast, the case in which the slave module (on the second programmable logic controller) and the master module (on the first programmable logic controller) reciprocally undertake the aforementioned tasks of the respective other module at the same time results in recursions (e.g. controller A manages controller B, controller B manages controller A), which are usually not useful in practical applications. In one preferred embodiment, the programming template recognizes a recursion and reacts thereto, for example by outputting an error message.

A particular preference is an embodiment in which the programming template is provided for a user via an assistance interface (also referred to as a "Wizard"), for example by means of dialogue-based code generation. The assistance interface makes it easier for a user to write and/or modify an application program.

Thus, the assistance interface can use input panels as functions to allow, in particular, the user to assign a controller (e.g. by means of name, IP address, . . . ) to modules or the mode-of-operation manager when said modules or mode-of-operation manager are added, and/or the user to subsequently use input dialogues to alter a controller assignment for the modules and mode-of-operation manager and/or a new mode of operation or a new state to be created, deleted or renamed and then the associated data structures to be customized across control systems in all associated modules.

Advantageously, the assistance interface knows correlations between the programmable modules and a mode-of-operation manager across control systems. From this information, the assistance interface can automatically produce predefined visualizations for the operator control of a machine on control consoles. Such visualization can provide an overview image for the machine(s) with all the modules, associated axles and the mode-of-operation manager, for example. This overview image can be used to indicate the current state and diagnoses for the modules. A preference is an embodiment in which the visualization is customized automatically or by an input from a user to changes to one or more programmable module(s) or a mode of operation.

Such presentation facilitates diagnosis and error correction, since fault location and report become immediately visible.

The programming template may be available as an executable data structure or in the form of a computer program source text. Suitable data storage media for providing the programming template or the computer program are, in particular, floppy disks, hard disks, flash memories, EEPROMs, CD-ROMs, DVDs and the like. It is also possible for a program to be downloaded via computer networks (internet, intranet, etc.).

Further advantages and refinements of the disclosure can be found in the description and in the accompanying drawing.

It goes without saying that the features cited above and those which are yet to be explained below can be used not only in the respectively indicated combination but also in other combinations or on their own without departing from the scope of the present disclosure.

The disclosure is shown schematically in the drawings using exemplary embodiments and is described in detail below with reference to the drawings.

DETAILED DESCRIPTION

Figure 1:
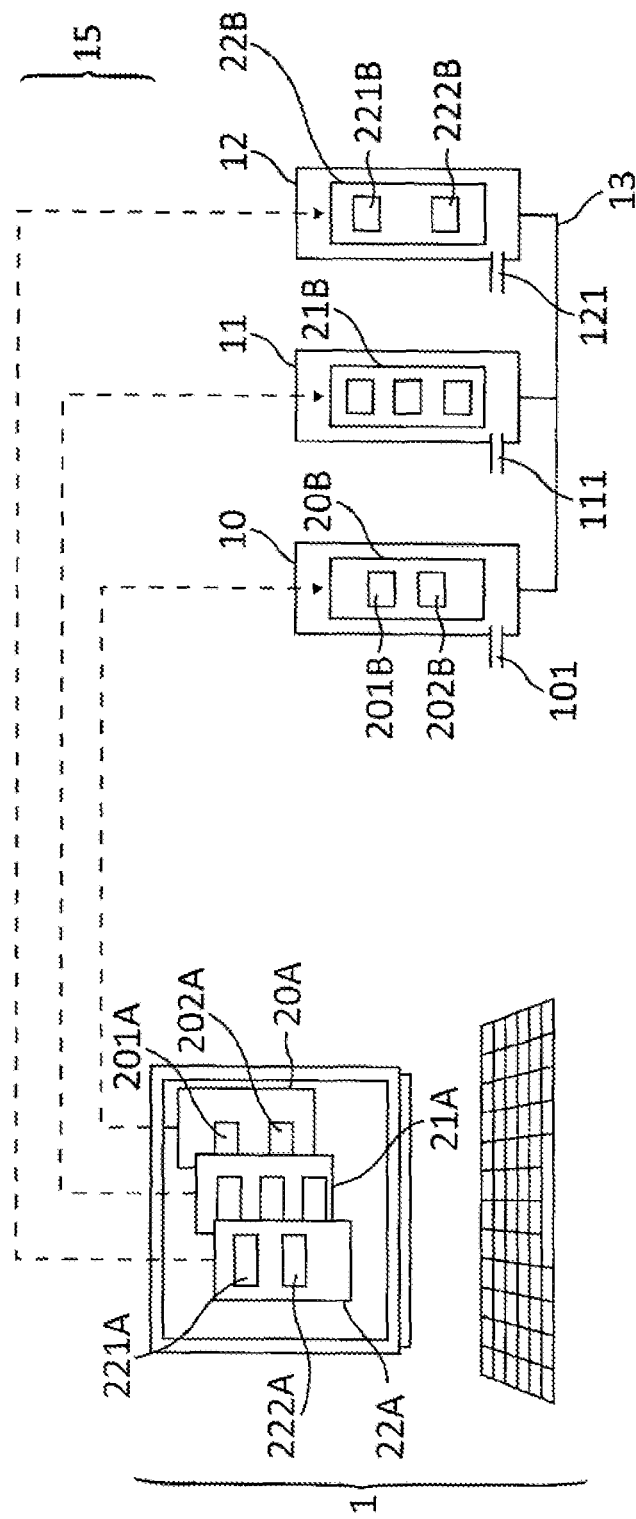
FIG. 1 shows a plurality of controllers for which, in line with the prior art, a respective autarkic programming template is provided.

FIG. 1 schematically shows how, in line with the prior art, application programs for machine installations having a plurality of programmable logic controllers 10, 11 and 12 can be written. The controllers are connected to one another via a communication network 13 and each have inputs and outputs 101, 111 and 121. These can be used for transmitting states, modes of operation, axle data and/or other information between the machine(s) to be controlled and the respective programmable logic controller.

For the purpose of programming application programs for the controllers, a programming device 1 has programming templates 20A, 21A and 22A available on it which comprise programmable modules 201A, 202A, 221A, 222A, in particular. The programming templates are each used for writing an application program for one of the programmable logic controllers. Thus, when an application program has been written using the programming template 20A, the resultant application program 20B is transmitted to the programmable logic controller 12 via a data link 15. The application program 20B comprises the programmed modules 201B and 202B that have been produced using the programmable modules 201A, 202A of the programming template 20A.

Similarly, application programs 21B and 22B produced using the programming templates 21A and 22A are transmitted with the associated modules (particularly the modules denoted by the reference symbols 221B and 222B) to the programmable logic controllers 11 and 12 via the data link 15.

The application programs for the various programmable logic controllers 10, 11 and 12 are therefore produced separately with a respective programming template.

Figure 2:
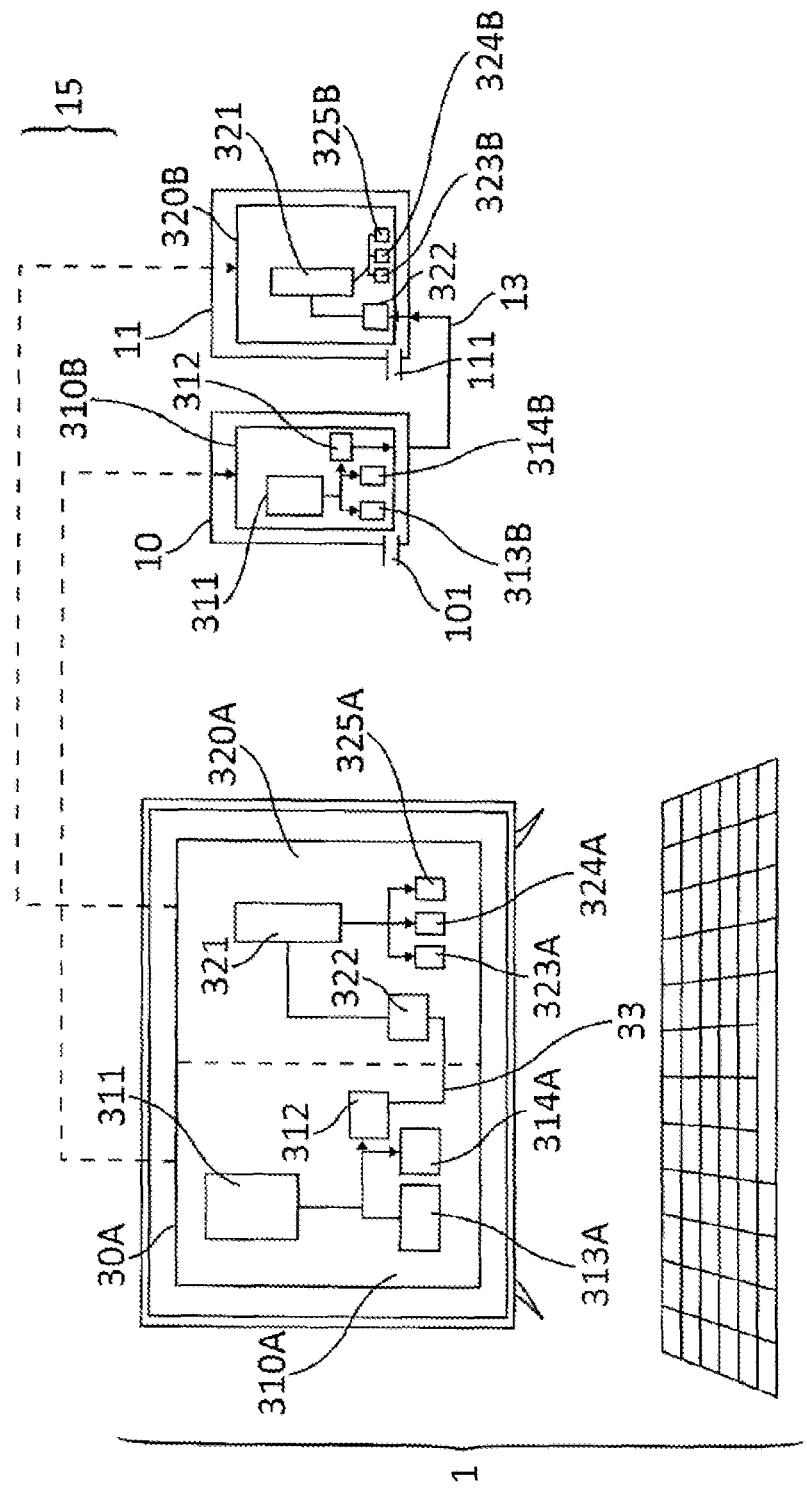
FIG. 2 shows an example of an embodiment of the present disclosure.

FIG. 2 schematically shows an embodiment of the programming template 30A according to the disclosure which can be used to write an application program distributed over two programmable logic controllers 10 and 11. In a similar manner to the case shown in FIG. 1, these controllers each have inputs and outputs 101, 111 and are connected to one another by a communication network 13.

The programming template 30A is shown as being in two portions with portions 310A and 320A. The portion 310A comprises elements which, following full programming of the application program, are transmitted as a portion 310B thereof to the programmable logic controller 10, and executed by the latter, via the data line 15. Similarly, the portion 320A comprises elements which are transmitted as application program portion 320B to the programmable logic controller 11 and are executed by the latter.

The programming template portions 310A and 320A each comprise a mode-of-operation manager 311 or 321 for coordinating the programmable modules 313A and 314A or 323A, 324A, 325A (or at the control end for the application program portions 310B and 320B for coordinating the programmed modules 313B, 314B and 323B, 324B, 325B) in respect of modes of operation of the machine(s) to be controlled.

The programmable modules 313A, 314A, 323A, 324A and 325A are connected to one another by a logical communication link 33. This communication link comprises a master module 312 in the programming template portion 310A and a slave module 322 in the programming template portion 320A. The master module 312 is set up to operate on the programmable logic controller 10, whereas the slave module 322 is set up to operate on the programmable logic controller 11. In this case, the master module and the slave module can undertake the tasks described above and can communicate with one another via the communication network 13, which can be used for implementing the logical communication link 33 on the controllers. In this way, an application program that has been written using the programming template 30A can be distributed over the controllers 10 and 11 in portions 310B and 320B and executed in coordinated fashion thereon.

Figure 3:
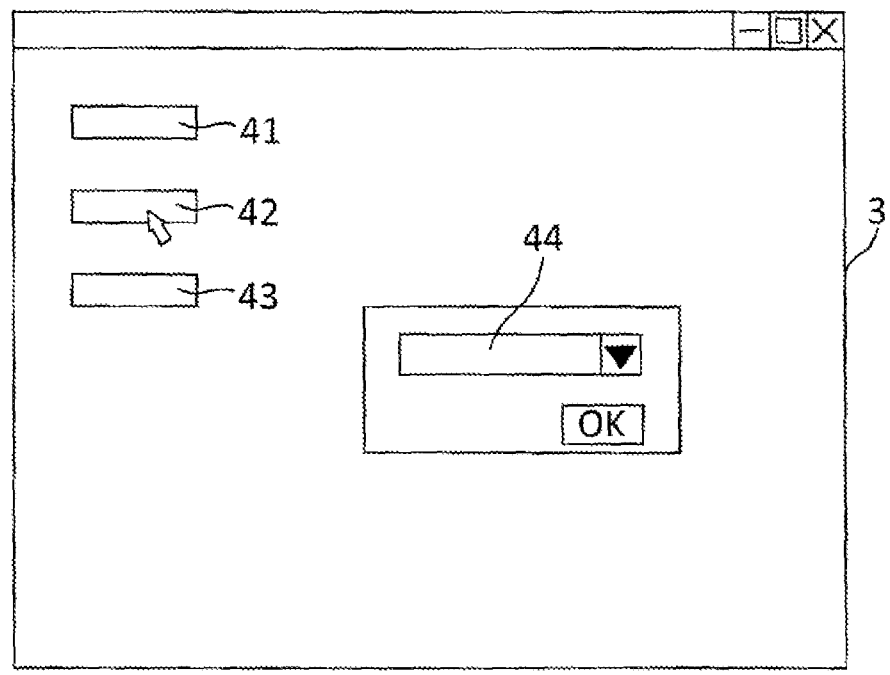
FIG. 3 shows an example of an assistance interface for a programming template.

FIG. 3 schematically shows an assistance interface 3 which can be used to provide a user with a programming template according to the disclosure. A user can use input panels 41, 42, 43, 44 to program programmable modules on a dialogue basis, for example by stipulating desired properties or functions of a programmable module in the application program to be programmed. Alternatively or in addition, he can add, change and/or delete modes of operation, states and/or programmable modules, for example.

What is claimed is:

1. A programming template for developing an application program comprising:
 a plurality of programmable modules configured to be integrated into the application program and executed on a respective associated programmable logic controller of a plurality of programmable logic controllers, at least one first programmable module being associated with a first programmable logic controller of the plurality of programmable logic controllers, and at least one second programmable module being associated with a second programmable logic controller of the plurality of programmable logic controllers; and
 a logical communication link between the plurality of programmable modules configured to coordinate the plurality of programmable modules across control systems, the logical communication link including a master module and a slave module,
 wherein the master module is configured to operate on the first programmable logic controller of the plurality of programmable logic controllers,
 wherein the slave module is configured to operate on the second programmable logic controller of the plurality of programmable logic controllers,
 wherein during initialization of the application program developed using the programming template, the programming template prompts the second programmable logic controller with the slave module and the at least one second programmable module to transmit initialization data to the master module, and prompts the first programmable logic controller to follow the transmission of the initialization data by putting the first programmable logic controller and the second programmable logic controller and the associated programmable modules thereof into the operating state through initialization states,
 wherein the plurality of programmable logic controllers are connected to one another by a communication network, and
 wherein the application program is configured to be executed in a manner distributed over the plurality of programmable logic controllers.

2. The programming template according to claim 1, wherein while operating on the first programmable logic controller, the master module is configured to at least one of (i) communicate with the slave module and to manage the at least one second programmable module, and (ii) communicate with the at least one first programmable module and to detect one or more properties of the first programmable module.

3. The programming template according to claim 1, wherein the slave module is configured (i) to supervise the at least one second programmable module, (ii) to detect a status of the at least one second programmable module, and (iii) to communicate the status to the master module.

4. The programming template according to claim 1, wherein:
 at least two programmable modules of the plurality of programmable modules are associated with the second programmable logic controller, and
 the slave module is configured (i) to detect a respective status of each programmable module of the at least two programmable modules, (ii) to combine the respective statuses to form a joint actual state, and (iii) to communicate the joint actual state to the master module.

5. The programming template according to claim 1, wherein:
 at least one third programmable module of the plurality of programmable modules is associated with a third programmable logic controller of the plurality of programmable logic controllers,
 the logical communication link is configured to connect the at least one third programmable module to at least one of (i) the at least one first programmable module, and (ii) the at least one second programmable module,
 the logical communication link includes a connection between the slave module and a further slave module, and
 the further slave module is configured to operate on the third programmable logic controller.

6. The programming template according to claim 5, wherein:
 the slave module is configured (i) to communicate with the further slave module, (ii) to manage the at least one third programmable module, (iii) to communicate with the at least one second programmable module, and (iv) to detect at least one property of the at least one second programmable module, and
 the at least one property includes a status of the at least one second programmable module.

7. The programming template according to claim 1, wherein:
 the slave module includes a function configured to report a local error on the second programmable logic controller to the master module in the event of the local error, and
 the function is selectable by a user.

8. The programming template according to claim 1, wherein:
 the master module is configured (i) to detect termination of a connection to the slave module, and (ii) to react to the detected termination of the connection to the slave module by slowing down a control drive, changing over to a local state machine, or ignoring the detected termination of the connection to the slave module, and
 the slave module is configured (i) to detect termination of a connection to the master module, and (ii) to react to the detected termination of the connection to the master module by slowing down the control drive, changing over to the local state machine, or ignoring the termination of the connection to the master module.

9. The programming template according to claim 1, wherein each programmable logic controller of the plurality of programmable logic controllers is implemented on a piece of dedicated or autarkic control hardware.

10. The programming template according to claim 1, wherein during creation, deletion, or renaming of a state or of a mode of operation of one or more of the programmable modules of the plurality of programmable modules, the programming template is configured to automatically customize respective associated data structures in one or more other of the plurality of programmable modules.

11. The programming template according to claim 1, further comprising:
   an assistance interface including a plurality of input panels, the assistance interface being configured to be used (i) to add one or more of the programmable modules and/or a mode-of-operation manager to the programming template, (ii) to delete the one or more of the programmable modules and/or the mode-of-operation manager from the programming template, and (iii) to rename the one or more of the programmable modules and/or the mode-of-operation manager,
   wherein the assistance interface is further configured (i) to associate the one or more of the programmable modules with a respective programmable logic controller, and/or (ii) to change an association between the one or more of the programmable modules and the respective programmable logic controller, and
   wherein the programming template is provided for a user via the assistance interface.

12. The programming template according to claim 1, wherein a computer program includes a program code configured (i) to be compiled on a corresponding computation unit, and (ii) to prompt the corresponding computation unit to generate the programming template.

13. The programming template according to claim 12, wherein the computer program is stored on a machine-readable storage medium.

* * * * *